United States Patent
Cromer et al.

(10) Patent No.: US 6,954,147 B1
(45) Date of Patent: Oct. 11, 2005

(54) METHOD AND SYSTEM FOR PROVIDING PROTECTION AGAINST THEFT AND LOSS OF A PORTABLE COMPUTER SYSTEM

(75) Inventors: Daryl C. Cromer, Apex, NC (US); David B. Rhoades, Apex, NC (US); Howard J. Locker, Cary, NC (US); James P. Ward, Raleigh, NC (US); Eric R. Kern, Durham, NC (US); Brandon J. Ellison, Raleigh, NC (US); Richard A. Dayan, Wake Forest, NC (US)

(73) Assignee: Lenovo Pte. Ltd., Singapore (SG)

( * ) Notice: Subject to any disclaimer, the term of this patent is extended or adjusted under 35 U.S.C. 154(b) by 0 days.

(21) Appl. No.: 09/282,893

(22) Filed: Mar. 31, 1999

(51) Int. Cl.[7] .................. G08B 13/14; G06F 11/30; G06F 12/14; H04L 9/00; H04L 1/26

(52) U.S. Cl. ............... 340/568.1; 340/571; 713/200

(58) Field of Search .................. 455/404, 410, 455/411, 421, 456, 556, 557, 521; 340/539, 340/568.1, 568.6, 568.7, 571, 572.1; 713/200

(56) References Cited

U.S. PATENT DOCUMENTS

| | | | | |
|---|---|---|---|---|
| 5,532,690 A | * | 7/1996 | Hertel | 342/457 |
| 5,748,084 A | * | 5/1998 | Isikoff | 340/568.1 |
| 5,936,526 A | * | 8/1999 | Klein | 340/571 |
| 5,963,131 A | * | 10/1999 | D'Angelo et al. | 340/568.1 |
| 6,052,782 A | * | 4/2000 | Fleming et al. | 713/200 |
| 6,300,863 B1 | * | 10/2001 | Cotichini et al. | 340/5.8 |

* cited by examiner

*Primary Examiner*—William D. Cumming
(74) *Attorney, Agent, or Firm*—Sawyer Law Group LLP

(57) ABSTRACT

Aspects for providing protection against theft and loss of a portable computer system are described. The aspects include establishing boundary conditions within which the portable computer system is authorized for use and tracking a position of the portable computer system with a global position system (GPS) unit in the portable computer system. The position is compared to the boundary conditions to identify whether the portable computer system has violated the boundary conditions, and anti-theft routines are performed when the position has violated the boundary conditions. The anti-theft routines include calling a preset phone number with a cellular calling facility of the portable computer system.

20 Claims, 6 Drawing Sheets

US 6,954,147 B1

METHOD AND SYSTEM FOR PROVIDING PROTECTION AGAINST THEFT AND LOSS OF A PORTABLE COMPUTER SYSTEM

FIELD OF THE INVENTION

The present invention relates to portable computer systems, and more particularly to providing protection against theft for portable computer systems.

BACKGROUND OF THE INVENTION

Advancing technology has created smaller and lighter components that are readily utilized in portable computer systems. The ability to have full computing power in a lightweight and convenient size makes portable computers attractive to many users. For example, portable computers are increasingly popular among travelers and telecommuters.

With their mobile nature and popularity, portable computer systems remain at high risk for theft. While the utilization of a system password provides some means of controlling access to portable systems, the loss of the system can be quite costly, including costs associated with recouping data and reconfiguring a new system. Thus, a need exists for improved security capabilities for portable computer systems that provide protection against theft and loss of a portable computer system.

The present invention addresses such needs.

SUMMARY OF THE INVENTION

The present invention provides system and method aspects for providing protection against theft and loss of a portable computer system. The present invention includes establishing boundary conditions within which the portable computer system is authorized for use and tracking a position of the portable computer system with a global position system (GPS) unit in the portable computer system. The position is compared to the boundary conditions to identify whether the portable computer system has violated the boundary conditions, and anti-theft routines are performed when the position has violated the boundary conditions. The anti-theft routines include calling a preset phone number with a cellular calling facility of the portable computer system.

Through the present invention, improved security for portable computer systems is achieved. The present invention provides efficient and effective mechanisms for locating and recovering a lost/stolen portable computer system. These and other advantages of the aspects of the present invention will be more fully understood in conjunction with the following detailed description and accompanying drawings.

DETAILED DESCRIPTION

The present invention relates to security mechanisms in a portable computer system. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
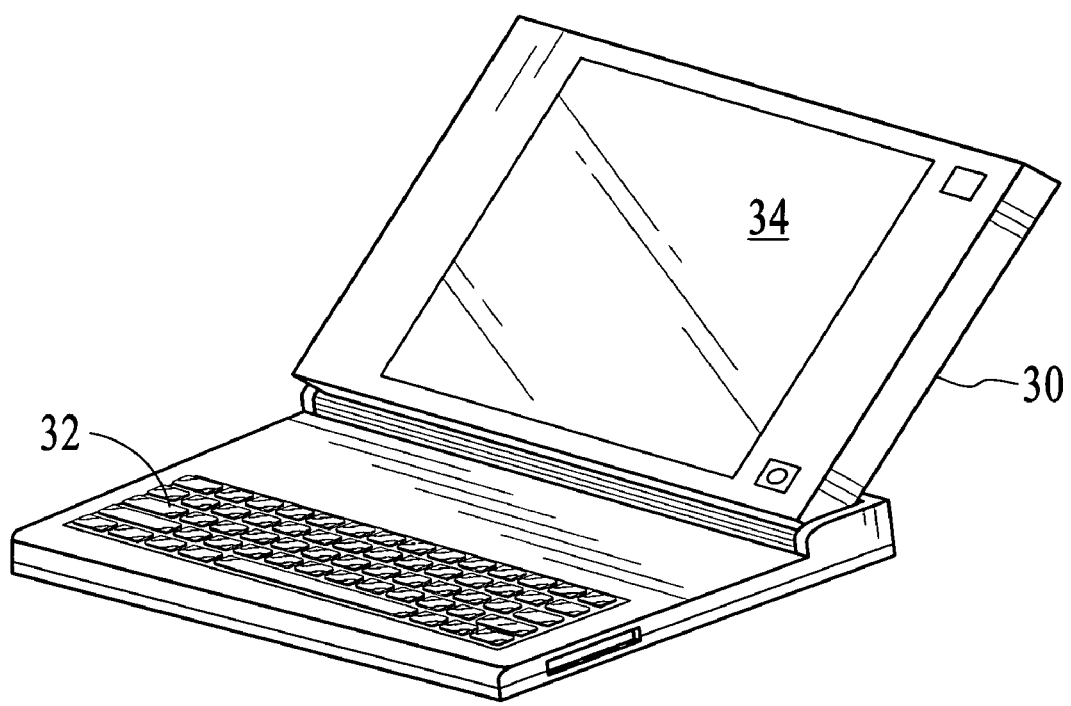
FIG. 1 illustrates a representation of a portable computer system in accordance with the present invention.

FIG. 1 depicts a pictorial representation of a portable computer in accordance with the method and system of the present invention. Portable computer 30 may be implemented utilizing any portable computer configured as described below and capable of being coupled to a docking station (not shown), e.g., as an ThinkPad portable computer available from IBM Corporation of Armonk, N.Y. Portable computer 30 includes a keyboard 32, a display 34, and other components, as described in more detail with reference to FIG. 2.

Figure 2:
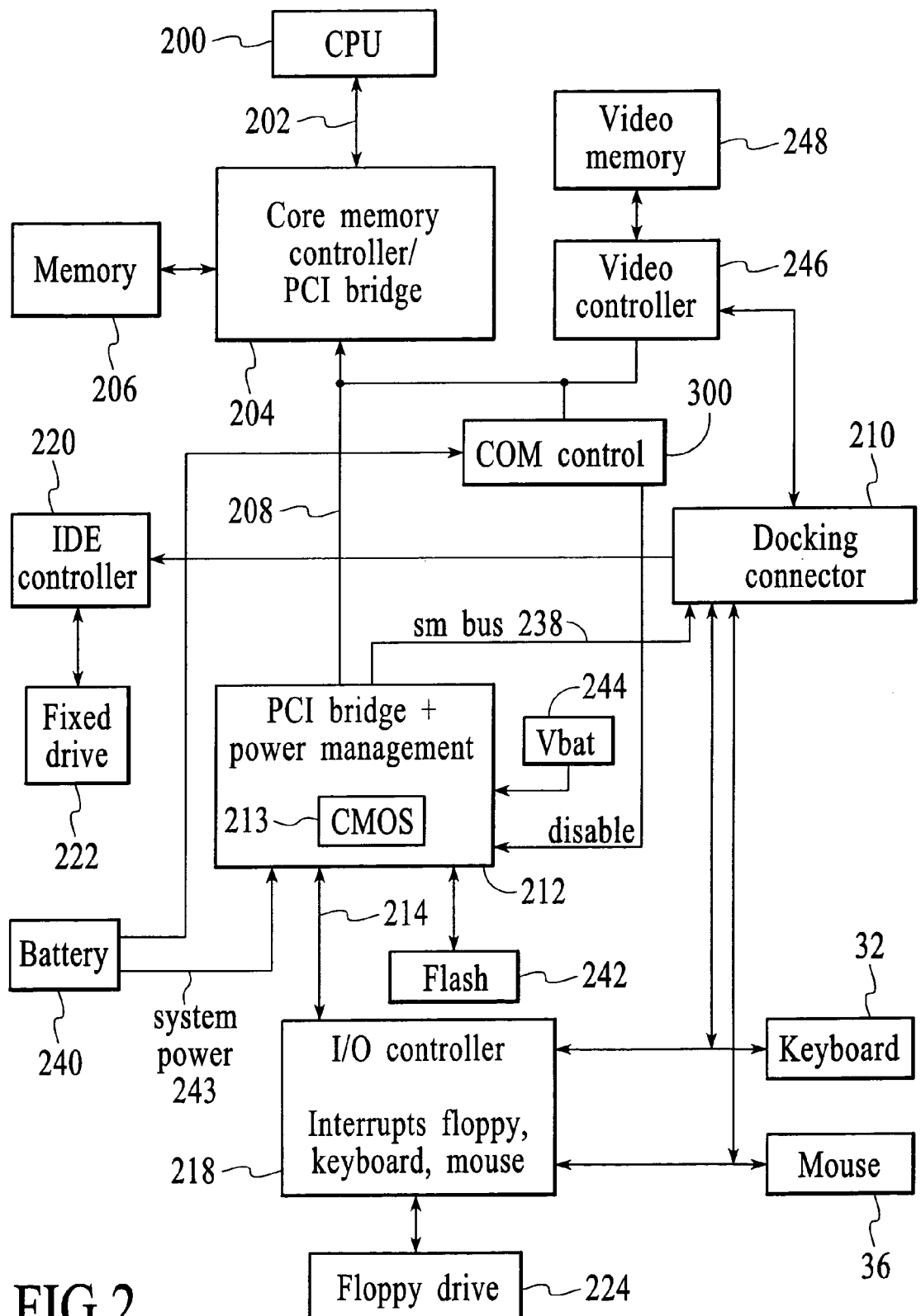
FIG. 2 illustrates a schematic diagram of the portable computer system of FIG. 1.

FIG. 2 depicts a high-level schematic diagram of the portable computer of FIG. 1 in accordance with the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus bridge 212 are connected to PCI bus bridge 204 utilizing PCI bus 208. IDE controller 220 provides for the attachment of IDE compatible storage devices such as fixed disk drive 222. PCI bridge 212 includes power management logic.

An I/O controller 218 is coupled to PCI bridge controller 212 and docking connector 210. I/O controller 218 controls communication between PCI bridge controller 212 and devices and peripherals such as floppy drive 224, keyboard 32, and mouse 36, so that these devices may communicate with CPU 200.

PCI bridge controller 212 includes an interface for a flash memory 242 which includes microcode which executes upon power-on. Flash memory 242 is an electrically erasable programmable read only memory (EEPROM) module and includes BIOS (basic input/output system) that is used to interface between the I/O devices and operating system. PCI bridge controller 212 also includes storage 213, which is preferably implemented utilizing CMOS storage, that holds the BIOS settings. Storage 213 includes values which describe the present configuration of the system. For example, storage 213 includes information describing the list of initial program load (IPL) devices set by a user and the sequence to be used for a particular power method, the type of display, the amount of memory, time/date, etc. Furthermore, this data is stored in storage 213 whenever a special configuration program, such as configuration/setup is executed. PCI controller 212 is supplied power from battery 244 to prevent loss of configuration data in storage 213.

Portable computer 30 includes a video controller 246 which is coupled to docking connector 210. Video controller 246 is connected to video memory 248. The image in video memory 248 is read by controller 246 and displayed on display 34.

Portable computer 30 includes a battery 240 which supplies full normal system power 243. A system management bus (SM) 238 is included and is coupled to a docking connector 210. System management bus 238 is a two-wire, low-speed serial bus used to interconnect management and monitoring devices.

Figure 3:
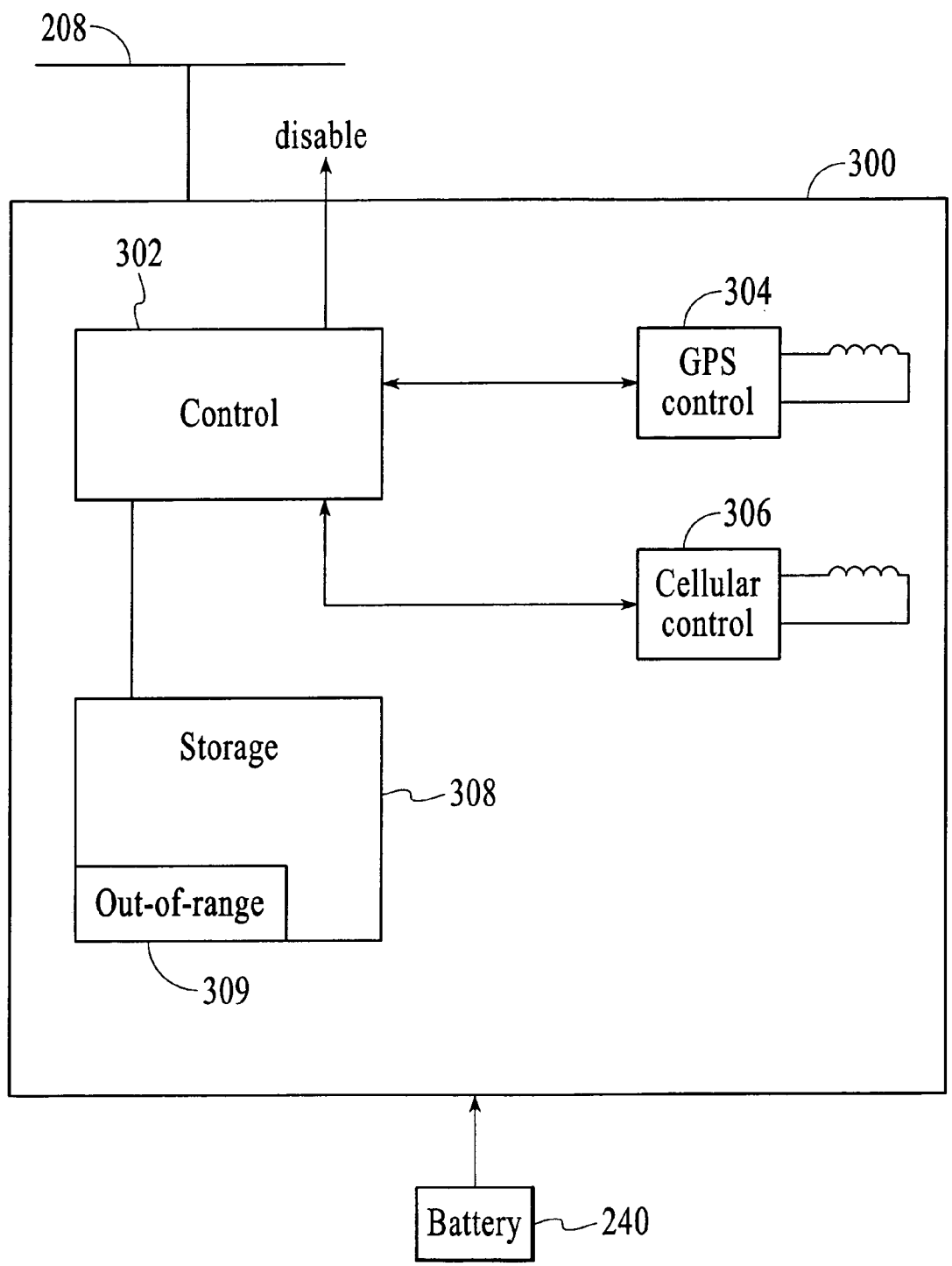
FIG. 3 illustrates a schematic diagram of a COM control unit of FIG. 2 in more detail.

Portable computer 30 further includes a command control unit (COM) 300 coupled to PCI bus 208, and PCI bridge and power management unit 212. FIG. 3 depicts a block diagram of command control unit 300 in more detail. As shown, command control unit 300 includes control logic 302 coupled to GPS (global position system) control 304, cellular communication control 306, and storage 308. The basic operations of GPS control 304 and cellular communication control 306 occur as is standardly understood. The present invention utilizes the features of the GPS control 304 and cellular control 306 in an effective manner to provide anti-theft security in the portable computer 30.

The Global Positioning System (GPS) is an accurate, three-dimensional navigation system. The GPS includes a constellation of twenty-one satellites and three spares that orbit the earth twice a day at an altitude of 10,898 miles. The satellites orbit the earth in six overlapping orbital planes which are based on the equatorial plane of the earth. The orbits of the satellites enable any GPS receiver near the surface of the earth to receive signals from at least four satellites at any one time, although precise position information can be obtained with only three satellites. A GPS receiver can be located in mobile units such as aircraft or ground vehicles to enable them to precisely locate their global positions. Each satellite continuously broadcasts pseudo-random codes at L-band frequencies, L1 at 1575.42 MHz and L2 at 1227.6 MHz. Each satellite broadcasts a slightly different signal and each satellite broadcasts two types of signals. One of these signals is referred to as C/A code, which is a signal that can be received by civilian type GPS receivers. The other signal is referred to as P code, which is a signal that can be received only by military type GPS receivers.

Ground stations on the earth receive transmissions from the satellites. These transmissions are analyzed and GPS time is compared with universal standard time at the ground stations. Corrections are transmitted to receivers in each of the satellites from the ground station. The signals, which include the time the signal left the satellite, are broadcast from the satellites and decoded by the GPS receiver using triangulation techniques provided by software in the receiver to determine the location. Specifically, the interval between the transmission and the reception of the satellite signal is used to calculate the unit's distance from each of the satellites being used. Those distances are used in the algorithms to compute the receiver's position.

Figure 4:
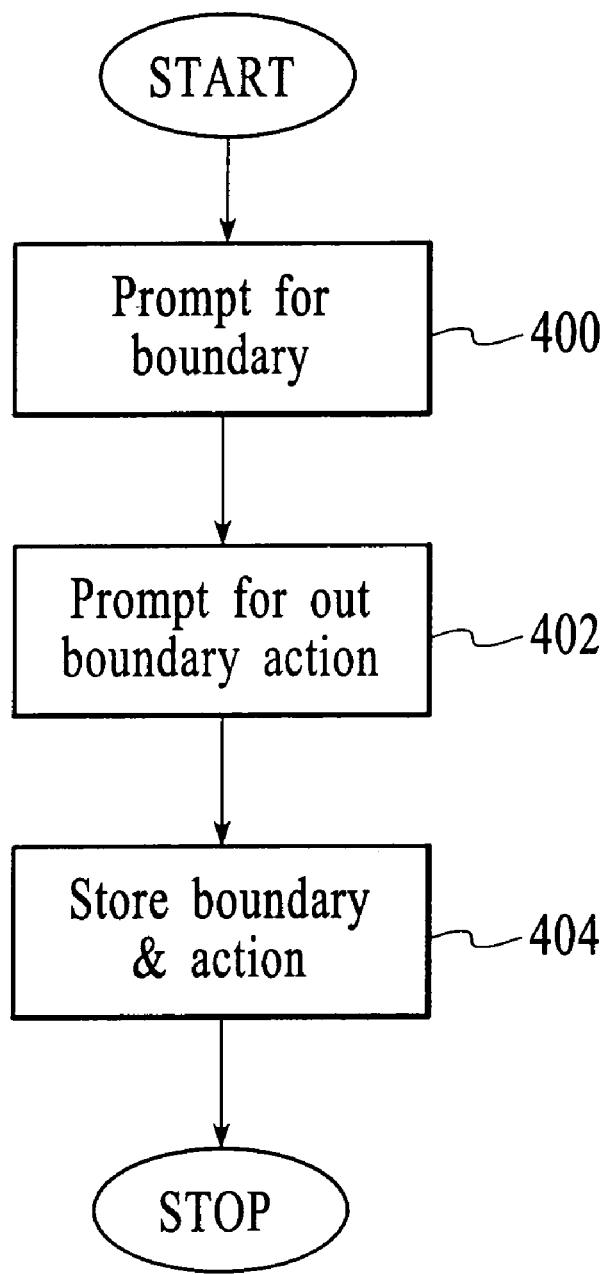
FIG. 4 illustrates a flow diagram for establishing preset boundary conditions in accordance with the present invention.

The present invention provides the ability to track the position of the portable computer 30 relative to preset boundary conditions as a component of achieving anti-theft security for the portable computer 30. FIG. 4 illustrates a flow diagram of a method for establishing the preset boundary conditions in accordance with the present invention. The process initiates with a prompting for the boundary condition (step 400). By way of example, a predetermined distance value relative to a central position in terms of a suitable measurement, such as miles or kilometers, could be used to give a radius or quadrant within which the portable computer 30 is authorized for use. The action(s) to be taken when an out-of-boundary condition occurs are then specified in response to a prompt (step 402). An out-of-boundary condition is indicated by the setting of an out-of-range bit (309) in storage 308 when the system is out-of-area. There are many possibilities for the action(s) taken in response to an out-of-boundary condition. A response that utilizes the cellular control 306 to initiate a phone call when the out-of-boundary condition occurs is an illustrative example of a default response. In order to be able to place a call, an emergency phone number is required. Thus, for step 402, a prompt is provided that requests an emergency phone number to be entered. Another response includes the disablement of the computer via signalling of a Disable signal by COM 300 (FIG. 2) when an out-of-boundary condition occurs. To counteract the disablement, a user supplies a password, i.e., a privilege access password (PAP) that is known only by the system owner to control key system settings. For step 402, therefore, a prompt for the entering of a PAP is provided. Storage of the boundary conditions and out-of-boundary action(s) occurs through storage component 308 of COM unit 300 (step 404) to complete the establishment of the boundary conditions.

Figure 5:
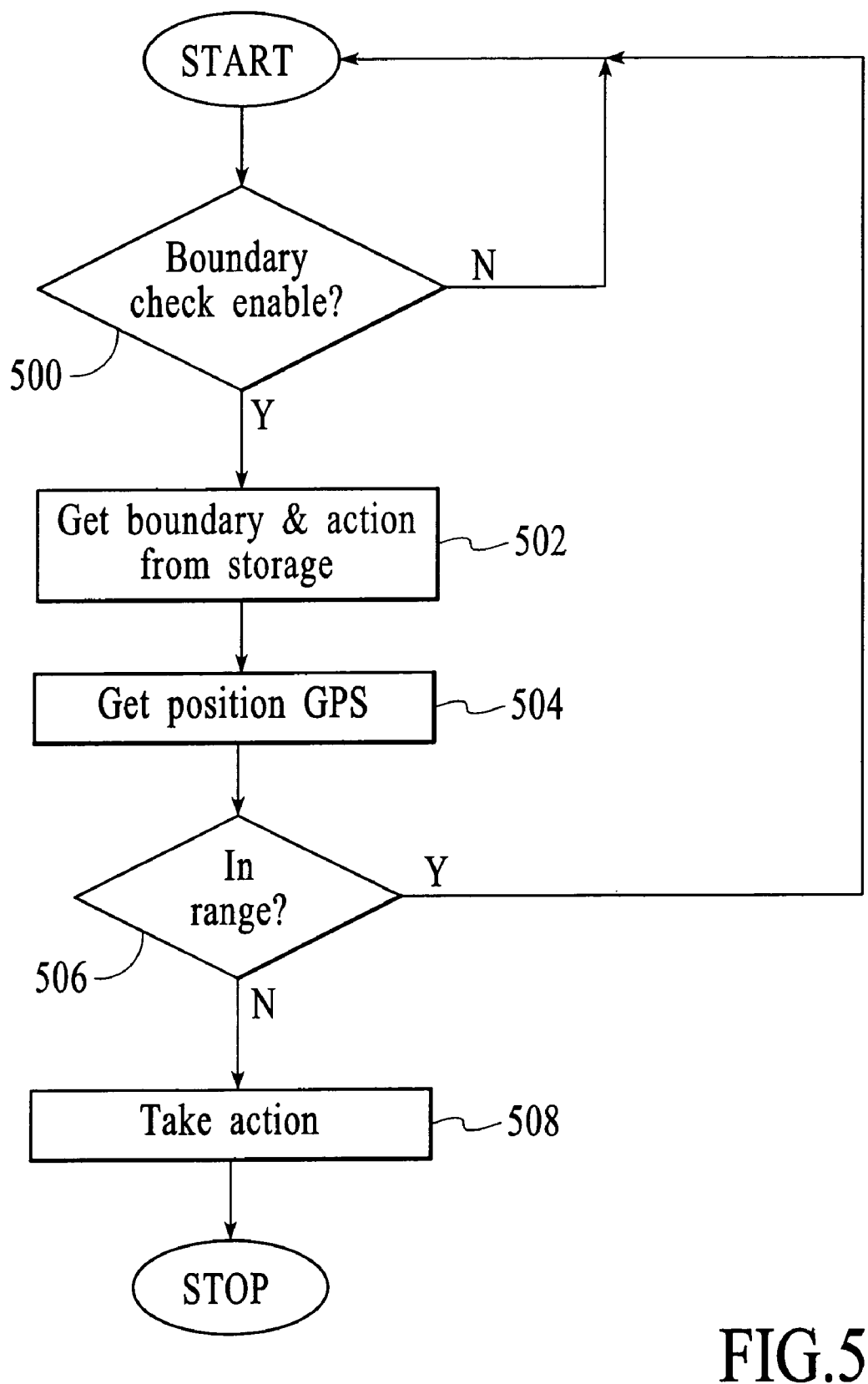
FIGS. 5 and 6 illustrate flow diagrams for performing a boundary check in accordance with the present invention.

With the boundary conditions established, they may be utilized for a boundary check via COM control unit 300, as described with reference to the flow diagram of FIG. 5. When the boundary check facility has been enabled in the portable computer 30, as determined via step 500, the boundary conditions and out-of-boundary action(s) are retrieved from storage 308 (step 502). A current position of the portable computer 30 as identified by the GPS control 304 is then obtained (step 504). When the portable computer 30 is in range, as determined via step 506, no action is necessary. When the portable computer is out-of-range, and the preset boundary condition has been violated, the preset out-of-boundary action(s) are then performed (step 508). In the illustrative embodiment, the cellular command unit is signalled to call the emergency phone number retrieved in step 502 and the current physical location is sent to that number. The location may be sent as a data stream using facsimile protocol or as pulse modulated data.

Figure 6:
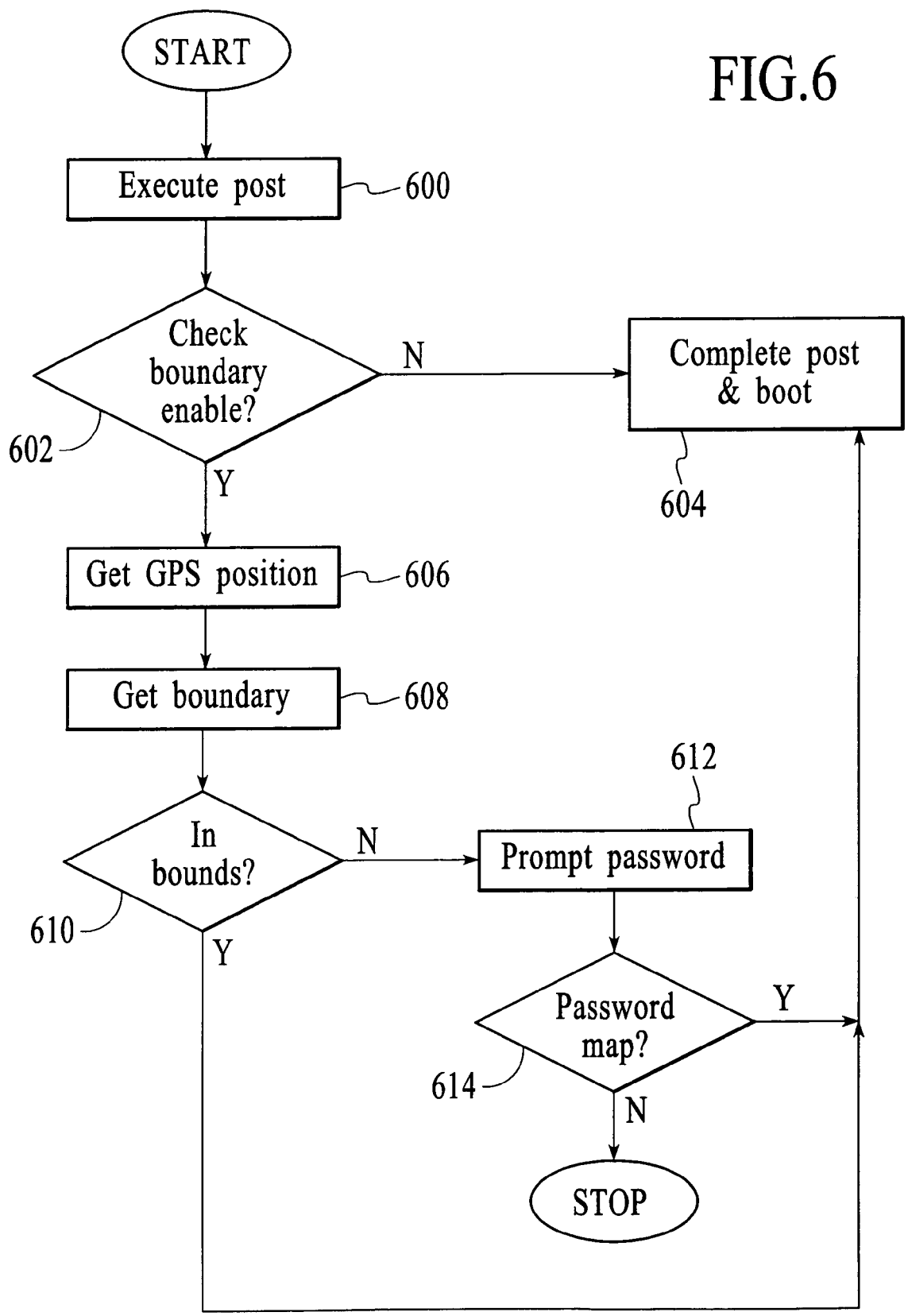

Referring now to FIG. 6, in terms of the portable computer 30, the boundary check initiates with the execution of POST (power-on self test) process (step 600). When the boundary check facility is not enabled, as determined in step 602, the POST process is completed and the portable computer is booted (step 604). When the boundary check facility is enabled, the GPS position is obtained (step 606) and the boundary condition is obtained (step 608), so that the check of the position relative to the boundary condition may be performed in step 610. When the portable computer remains in-bounds, the POST process completes and the boot process ensues (step 604). When an out-of-bounds condition is determined via step 610, a prompt for entering of the PAP is provided (step 612). When the password entered matches the PAP, as determined via step 614, the POST process is completed and the boot process follows (step 604). When the password entered does not match the master/control password, the portable computer performs the configured action, e.g., utilizes the emergency number to perform a call-in and report its location. Of course, a wrong password also capably restricts further access to the computer.

In addition to the effective comparison of a current position to preset boundary conditions to assist in controlling against theft in the present invention, the possibility exists that a portable computer may remain within the preset boundary conditions and yet be stolen. Therefore, in accordance with a further aspect of the present invention, while the boundary check facility is enabled, a call is made from the portable computer 30 via the COM control unit 300 to a preset phone number, e.g., the emergency phone number, at preset intervals, such as once a day. The call provides information that identifies the portable computer and the location of the portable computer based on the GPS data.

Thus, if the portable computer 30 remains 'in-bounds' but is stolen, the scheduled reporting feature of the present invention allows the location of the stolen computer to be reported. Of course, in order to change the frequency of the scheduled call-in or to disable the feature would require the PAP, and thus, perpetrators would be unable to counteract the function.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for providing protection against theft and loss of a portable computer system, the method comprising:
   establishing boundary conditions within which the portable computer system is authorized for use;
   tracking a position of the portable computer system with a global position system (GPS) unit in the portable computer system;
   comparing the tracked position to the boundary conditions to identify whether the portable computer system has violated the boundary conditions;
   performing anti-theft routines based on when the tracked position has violated the boundary conditions; and
   utilizing a preset calling function at preset intervals to identify a location of the portable computer system based on GPS data from the GPS unit based on when the tracked position has not violated the boundary conditions.

2. The method of claim 1 wherein performing anti-theft routines further comprises calling a preset phone number with a cellular calling facility of the portable computer system.

3. The method of claim 1 wherein performing anti-theft routines further comprises prompting a user for a password, wherein when the password matches a master password, operation of the portable computer system continues uninterrupted.

4. The method of claim 3 wherein when the password does not match the master password, operation of the portable computer system is disabled.

5. The method of claim 1 wherein tracking further comprises reporting the position of the portable computer system at preset intervals.

6. A method for providing protection against theft and loss of a portable computer system, the method comprising:
   utilizing GPS (global position system) functionality within a portable computer system to track a position of the portable computer system;
   identifying when the position tracked by the GPS functionality violates preset boundary conditions of the portable computer system;
   utilizing cellular calling functionality within the portable computer system to report a potential theft of the portable computer system based on when the preset boundary conditions have been violated by the position tracked; and
   utilizing a preset calling function at preset intervals with the cellular calling functionality to identify a location of the portable computer system based on when the preset boundary conditions have not been violated by the position tracked.

7. The method of claim 6 further comprising establishing the preset boundary conditions as a chosen distance from a given location within which use of the portable computer system is allowed.

8. The method of claim 6 wherein the step of utilizing cellular calling functionality further comprises calling a preset emergency phone number.

9. The method of claim 8 wherein the step of utilizing further comprises sending a location of the portable computer system to the preset emergency phone number.

10. The method of claim 9 wherein sending further comprises sending the location as a data stream using facsimile protocol.

11. The method of claim 6 further comprising utilizing the GPS functionality at regularly scheduled predetermined intervals.

12. The method of claim 6 further comprising utilizing the GPS functionality during booting upon power-up of the portable computer system.

13. A communication control system for providing built-in anti-theft capabilities in a portable computer system, the communication control system comprising:
   a controller;
   a cellular unit for performing a calling function at preset intervals;
   a GPS (global position system) unit coupled to the controller for tracking a position of the portable computer system; and
   a storage unit, the storage unit coupled to the controller and storing preset boundary conditions and out-of-boundary actions, wherein the controller compares the tracked position to the boundary conditions and initiates the out-of-boundary actions based on when the comparison identifies a violation of the boundary conditions by the tracked position, and wherein the calling function provides for an identification of a location of the portable computer system based on when there is not a violation of the boundary conditions by the tracked position.

14. The system of claim 13 wherein the cellular unit calls a preset phone number as an out-of-boundary action.

15. The system of claim 14 wherein the cellular unit further reports a location of the portable computer system.

16. The system of claim 13 wherein the GPS unit tracks the position at preset intervals.

17. The system of claim 13 wherein the storage unit stores a predetermined distance from a central location as an in-bounds condition for the portable computer system.

18. The method of claim 1 wherein the step of utilizing a preset calling function at preset intervals to identify a location of the portable computer system when the position has not violated the boundary conditions further comprises utilizing the identified location as a report for finding the portable computer system that satisfies the preset boundary conditions and is stolen.

19. The method of claim 6 wherein the step of utilizing a preset calling function at preset intervals with the cellular calling functionality to identify a location of the portable computer system when the preset boundary conditions have not been violated further comprises utilizing the identified location as a report for finding the portable computer system that satisfies the preset boundary conditions and is stolen.

20. The system of claim 13 wherein the identified location provides a report for finding the portable computer system that satisfies the boundary conditions and is stolen.

* * * * *